Figure 1:
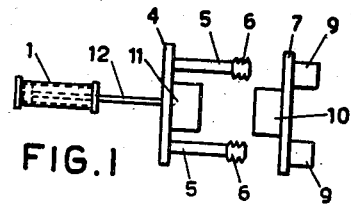

March 28, 1961

H. K. QUERÉ ET AL 2,976,569

DIE CASTING MACHINE OF HIGH PRESSURE INJECTION MOULDING DEVICE

Filed June 1, 1959

United States Patent Office 2,976,569
Patented Mar. 28, 1961

2,976,569

DIE CASTING MACHINE OF HIGH PRESSURE INJECTION MOULDING DEVICE

Hendrik K. Queré, 8 Koekoeksweg, and Bartholomeus J. Helders, 45 Gortelseweg, both of Vaassen, Netherlands Filed June 1, 1959, Ser. No. 817,188

Claims priority, application Netherlands June 5, 1958

4 Claims. (Cl. 18—30)

The invention relates to an improvement of a die casting machine or a high pressure injection moulding machine according to the British Patent 796,523, in which a mould section is adapted to be slidably displaced with respect to another mould section and is provided with a hydraulic pressure mechanism composed of a number of pressure cylinders, which pressure mechanism draws the moulding sections against each other under high pressure by means of releasable coupling rods, and intermediate coupling means, which, when the mould sections are closed or opened, effect the coupling or the uncoupling between the pressure cylinders and the other mould section, and when they are coupled or uncoupled are driven by a driving mechanism working independently of the pressure cylinders, in such a manner that the coupling or the uncoupling is effected in unloaded condition of the coupling means, which coupling means consist of a number of coupling claws carried by the free end of each coupling rod, said claws cooperating with coupling sleeves carried by the other mould section and internally being provided with associated claws, the coupling sleeves and the coupling rods being adapted to rotate with respect to each other by means of the driving mechanism.

With the die casting or high pressure injection moulding machine referred to the coupling means pertaining to each coupling rod are provided at the one end of the coupling rod, the pressure cylinder associated therewith being disposed at the other end of the coupling rod. This means that from the one mould section the coupling means, and from the other mould section the pressure cylinders must be actuated. It will be obvious that a stationary and a movable mould section must be employed, so that it will be necessary to provide the slidable mould section with flexible conduits or like feeding means for the working medium.

The object of the invention is to improve the machine referred to. According to the invention it will be possible to combine both the hydraulic pressure cylinders drawing the mould sections against each other under high pressure and the driving mechanism for the coupling means with the stationary mould section, which will facilitate the control and the feeding of the working medium.

According to the invention the abovementioned die casting or high pressure injection moulding machnie is arranged in such a manner, that each hydraulic pressure cylinder of the pressure mechanism is forming a constructive unit with the associated coupling means. In this way it will be possible to combine both the pressure mechanism and the driving mechanism with one of the mould sections, preferably the stationary mould section. The result is not only that the controlling of the two mechanisms and the feeding thereto of the working medium are facilitated, but also the construction of the whole machine is considerably simplified.

In a preferred embodiment of the machine according to the invention each coupling sleeve is housed in a hydraulic pressure cylinder with a shoulder acting as a piston. The rotary movement of each coupling sleeve which is externally provided with straight teeth, can be effected by means of a toothed rack engaging these teeth and adapted to perform reciprocating movements perpendicularly with repect to the longitudinal direction of the machine. Such an embodiment of the driving mechanism of the coupling members allows simply a movement of the coupling sleeves in longitudinal direction of the machine while the mould sections are drawn against each other.

The invention will now be elucidated with reference to an embodiment represented in the drawing, in which:

Figs. 1–6 show the essential parts of the machine according to the invention in various positions occurring when the machine is in operation and which will yet be further discussed below.

Figure 7:
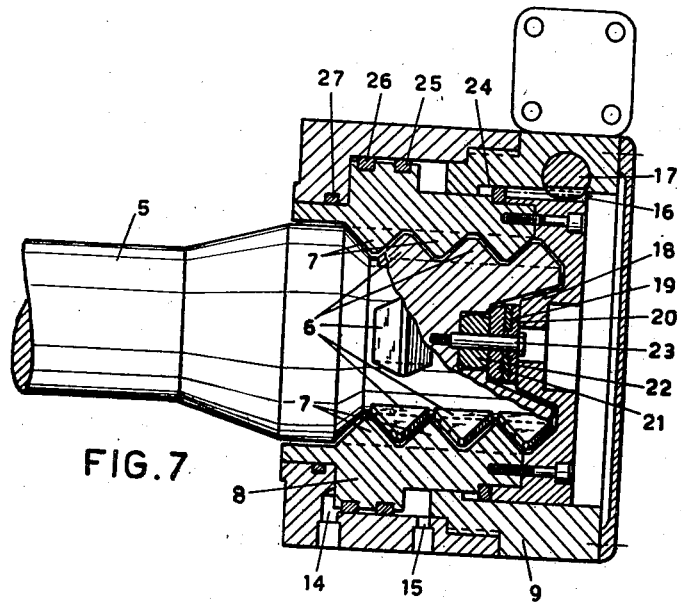

Fig. 7 gives further details of a hydraulic pressure cylinder, which forms a constructive unit with the coupling means associated therewith.

In the drawing the numeral 10 indicates the fixed mould section and 11 the slidable mould section, the casting being injected between said mould sections while the latter are in a locked state due to high pressure exerted on them. The injecting mechanism is not shown in the drawing since it is not essential for the present invention and is carried out in a known way. The injecting machine includes an arrangement for melting the material to be injected, e.g. a metal having a low melting point or a synthetic resin or plastic, and an arrangement for bringing the molten material under high pressure, said arrangement communicating with a feeding channel leading to the moulding space between the mould sections 10, 11. The injecting mechanism can be connected with the stationary part of the machine carrying the mould section 10.

The mould section 11 is supported by a block 4 that is slidable with respect to the base plate of the machine; this block carries the coupling rods 5 which are secured to the block 4. These coupling rods 5 may be symmetrically disposed around the mould sections 10, 11. The coupling rods 5, at their free ends, carry three sets of locking claws 6, engaging three sets of locking claws 7 of coupling sleeves 8, which are rotatable with respect to pressure cylinders 9, secured to the block 7, carried by the base plate of the machine and carrying itself the fixed mould section 10.

By means of a toothed rack drive 16, 17 (Fig. 7) the coupling sleeves 8 can be rotated in such a manner that they allow the claws 6 of the coupling rods 5 to enter the sleeves, whereupon said claws can be locked by a reverse rotary movement of each sleeve 8 through the toothed rack drive.

The block 4 can, together with the coupling rods 5 and the mould section 11, be reciprocated as a unit over a long stroke by means of a double acting hydraulic cylinder 1, the piston 12 of which is rigidly connected with the block 4, and which need only supply the low force for displacing the said unit.

As will be seen from Fig. 7, the coupling sleeve 8 is provided with a shoulder 13 operating as a piston which shoulder is incorporated in the pressure cylinder 9. By admitting pressure medium to the left side 14 of the shoulder 13 a great tensile force is exerted on each coupling rod 5, with the result that the mould sections 10, 11 are drawn together under high pressure. For releasing the mould sections each rod 5 is urged to the left by the admission of pressure medium on the right hand side of the shoulder 13 at 15.

The sealing of the pressure spaces 14 and 15 is effected by means of grooved packing rings 24, 25, 26 and 27, made preferably of synthetic rubber or another suitable synthetic material.

As Fig. 7 will further show, the coupling sleeve 8 is rotatably mounted for the coupling and uncoupling of the claws 6, 7 by means of the straight teeth 16 provided through a suitable portion of the circumference of the sleeve 8, which teeth are engaged by a rack 17. This rack is preferably hydraulically driven.

The correct mutual distance of the claws 6, 7 during the coupling and uncoupling is determined by a hub 18 of the sleeve 8, cooperating with a metal pressure plate 19, a bearing plate 20 preferably made of nylon or like synthetic material, a metallic intermediate plate 21 and a rubber block 22, which parts are connected together by a screw bolt 23 inserted at the free end of the rods 5.

Fig. 1 shows the machine in the opened position. The mould sections 10, 11 are completely separated and the space between the mould sections is well accessible.

Figure 2:
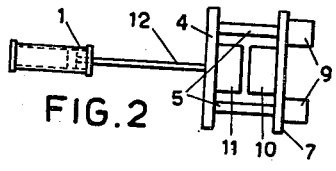

Fig. 2 shows the position of the machine after the pressure medium has been admitted to the cylinder 1 at the left hand side of the piston for closing the mould sections 10, 11, the claws 6 of the coupling rods 5 having entered between the claws 7 of the sleeves 8.

Figure 3:
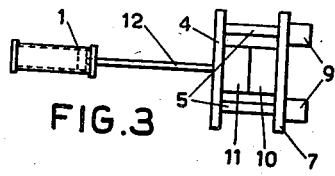

In Fig. 3 the claws of the sleeves 8 have been rotated by means of the rack drive 16, 17, in such a manner that the coupling claws 6, 7 are interlocked. This position is reached while the coupling means are practically in an unloaded position, as the spaces 14 are not standing under pressure.

Figure 4:
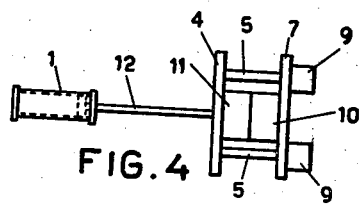

Fig. 4 shows the situation during the moulding operation. The spaces 14 are here under high pressure, so that the mould sections 10, 11 are drawn together under high pressure. The pressure in the working space 14 of the various pressure cylinders 9 may be chosen differently in view of the shape of the moulding space and its location with respect to the mould sections 10, 11.

Figure 5:
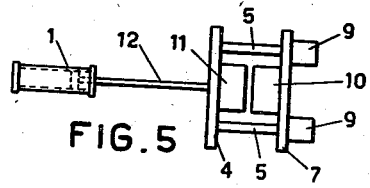

Fig. 5 shows the position during the initiation of the opening of the mould sections 10, 11, the working spaces 15 being brought under pressure.

Figure 6:
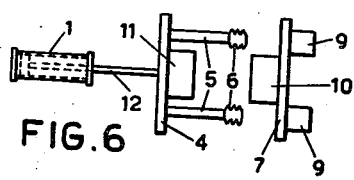

When a little gap is created between the mould sections 10, 11 the toothed rack 17 is actuated once more for uncoupling the coupling means by rotation of the coupling sleeves 8, which in this case are also in unloaded condition. Thereupon pressure medium is admitted into the cylinder 1 at the right hand side of the piston, as shown in Fig. 6, whereby the block 4 and the parts belonging thereto are brought back into the starting position shown in Fig. 1; the moulding can now be removed from the machine. In this state it is also possible to interchange the mould sections 10, 11.

What we claim is:

1. Material forming apparatus comprising mould sections adapted to be slidably displaced with respect to each other, a hydraulic pressure mechanism including a plurality of pressure cylinders, said pressure mechanism being adapted to draw the mould sections together under high pressure, releasable coupling rods and intermediate coupling means adapted to effect a selective coupling between the pressure cylinders and one of the mould sections, a driving mechanism working independently of the pressure cylinders and adapted to drive said rods and intermediate coupling means so that a selective coupling can be effected in unloaded condition of the coupling means, said coupling means including a plurality of claws on each coupling rod, and coupling sleeves carried by the other of said mould sections and internally including claws for engaging the first said claws, the coupling sleeves and the coupling rods being adapted for rotation with respect to each other by means of said driving mechanism, each pressure cylinder of the pressure mechanism being arranged adjacent the associated coupling means which are rotatable in the driving means.

2. Apparatus according to claim 1, wherein each coupling sleeve rotatable to the driving means is housed in one said pressure cylinder and includes a shoulder operating as a piston.

3. Apparatus according to claim 2, wherein each coupling sleeve comprises straight teeth, said apparatus comprising a toothed rack engaging said teeth and adapted to perform reciprocating movements.

4. Apparatus according to claim 1, wherein each coupling means comprises at least two sets of locking claws arranged one behind the other.

References Cited in the file of this patent

UNITED STATES PATENTS 2,916,768    Quere et al. _____ Dec. 15, 1959

UNITED STATES PATENT OFFICE
CERTIFICATE OF CORRECTION

Patent No. 2,976,569                  March 28, 1961

Hendrik K. Queré et al.

It is hereby certified that error appears in the above numbered patent requiring correction and that the said Letters Patent should read as corrected below.

In the grant, lines 1, 2 and 3, for "Hendrik K. Queré and Bartholomeus J. Helders, both of Vaassen, Netherlands," read -- Hendrik K. Queré and Bartholomeus J. Helders, both of Vaassen, Netherlands, assignors to N. V. "Industrie" (v/h Van Lohuizen & Co.), of Vaassen, Netherlands --; line 12, for "Hendrik K. Queré and Bartholomeus J. Helders, their heirs" read -- N. V. "Industrie" (v/h Van Lohuizen & Co.), its successors --; in the heading to the printed specification, lines 4 to 6, for "Hendrik K. Queré, 8 Koekoeksweg, and Bartholomeus J. Helders, 45 Gortelseweg, both of Vaassen, Netherlands" read -- Hendrik K. Queré and Bartholomeus J. Helders, both of Vaassen, Netherlands, assignors to N. V. "Industrie" (v/h Van Lohuizen & Co.), Vaassen Netherlands --.

Signed and sealed this 2nd day of January 1962.

(SEAL)
Attest:
ERNEST W. SWIDER
Attesting Officer

DAVID L. LADD
Commissioner of Patents